US008402301B2

(12) United States Patent
Venable, Sr.

(10) Patent No.: US 8,402,301 B2
(45) Date of Patent: Mar. 19, 2013

(54) DELAYING ONE-SHOT SIGNAL OBJECTS

(75) Inventor: Jeffrey C. Venable, Sr., Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 124 days.

(21) Appl. No.: 12/980,598

(22) Filed: Dec. 29, 2010

(65) Prior Publication Data

US 2011/0099409 A1 Apr. 28, 2011

Related U.S. Application Data

(63) Continuation of application No. 12/042,558, filed on Mar. 5, 2008, now Pat. No. 7,886,175.

(51) Int. Cl.
*G06F 1/12* (2006.01)

(52) U.S. Cl. ......................... 713/400; 713/401; 713/600

(58) Field of Classification Search .................. 713/400, 713/401, 600, 601; 709/248
See application file for complete search history.

(56) References Cited

U.S. PATENT DOCUMENTS 3,701,972 A 10/1972 Berkeley et al.
4,419,756 A 12/1983 Cheng-Quispe et al.
6,101,194 A * 8/2000 Annapareddy et al. ....... 370/447
6,587,958 B1 7/2003 Oshins et al.
7,886,175 B1 2/2011 Venable, Sr.
2007/0103135 A1 5/2007 Ito

OTHER PUBLICATIONS

Co-pending U.S. Appl. No. 12/042,558, filed Mar. 5, 2008 entitled "Delaying One-Shot Signal Objects" by Jeffrey C. Venable, Sr., 37 pages.

* cited by examiner

*Primary Examiner* — Mark Connolly
(74) *Attorney, Agent, or Firm* — Harrity & Harrity, LLP

(57) ABSTRACT

A device may include a processor to execute a thread. The processor may be further configured to execute a set of wrappers that are called from within the thread to invoke a set of one-shot signal objects to generate delayed signals. Each of the set of wrappers may be configured to detect whether different ones of one-shot signal objects that were invoked from within the thread have generated signals at periodic time intervals, determine a delay to be used for invoking one of the set of one-shot signal objects, and invoke the one of the set of one-shot signal object to generate one of the delayed signals based on the delay when the different ones of one-shot signal objects have generated signals at periodic time intervals. The processor may be further configured to receive the delayed signals generated from the set of one-shot signal objects over a time period.

20 Claims, 10 Drawing Sheets

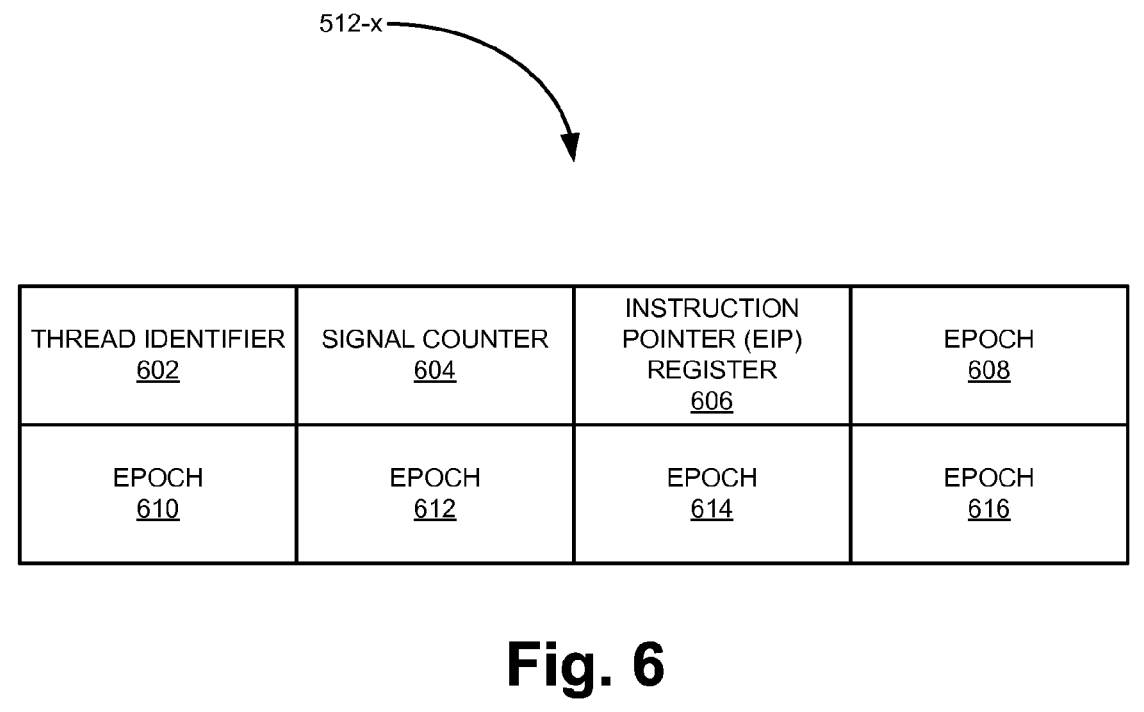

512-x

| THREAD IDENTIFIER 602 | SIGNAL COUNTER 604 | INSTRUCTION POINTER (EIP) REGISTER 606 | EPOCH 608 |
|---|---|---|---|
| EPOCH 610 | EPOCH 612 | EPOCH 614 | EPOCH 616 |

Fig. 6

DELAYING ONE-SHOT SIGNAL OBJECTS

RELATED APPLICATION

This application is a continuation of U.S. patent application Ser. No. 12/042,558, filed Mar. 5, 2008, which is incorporated herein by reference.

BACKGROUND

Today's hardware and/or software components use timers for different purposes. In some instances, the timers are used by one component to cause another component to perform an action at a prescribed time.

SUMMARY

According to one aspect, a device may include a processor to execute a thread. The processor may be further configured to execute a set of wrappers that are called from within the thread to invoke a set of one-shot signal objects to generate delayed signals. Each of the set of wrappers may be configured to detect whether different ones of one-shot signal objects that were invoked from within the thread have generated signals at periodic time intervals, determine a delay to be used for invoking one of the set of one-shot signal objects, and invoke the one of the set of one-shot signal object to generate one of the delayed signals based on the delay when the different ones of one-shot signal objects have generated signals at periodic time intervals. The processor may be further configured to receive the delayed signals generated from the set of one-shot signal objects over a time period.

According to another aspect, a computer-readable memory may include computer-executable instructions for invoking a set of one-shot signal objects. The instructions for invoking the set of one-shot signal objects may include instructions for detecting whether signals are periodically sent from different one-shot signal objects, instructions for generating a delay when the signals are periodically being sent from the different one-shot signal objects, instructions for determining a time at which one of the set of one-shot signal objects is to generate a signal based on the delay, instructions for calling the one of the set of one-shot signal objects and conveying the time at which the one of the set of one-shot signal objects is to generate the signal, and instructions for receiving the signal that is sent from the one of the set of one-shot signal objects in response to being called.

According to yet another aspect, a device may include means for allocating memory for a signal information object, means for recording information related to signals that are generated from one-shot signal objects in the signal information object, means for deciding whether the signals are periodically overloading the device based on the recorded information, means for determining a delay when the device is overloaded by the signals, means for providing the determined delay to a one-shot signal object, means for calling the one-shot signal object, means for receiving a signal from the one-shot signal object in response to the call, and means for responding to the signal from the one-shot signal object.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 6 is a block diagram of an exemplary signal information object of FIG. 5;

DETAILED DESCRIPTION OF PREFERRED EMBODIMENTS

Figure 1:
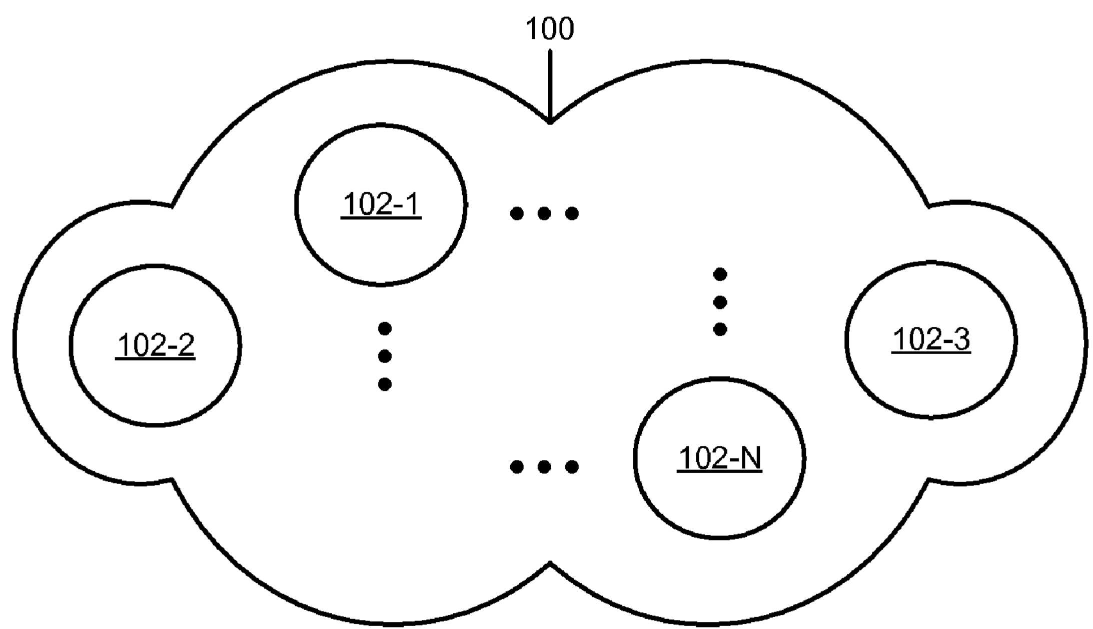
FIG. 1 is a diagram of an exemplary network in which concepts described herein may be implemented.

The following detailed description refers to the accompanying drawings. The same reference numbers in different drawings may identify the same or similar elements.

In the following, a component may delay periodic transmissions of signals from different one-shot signal objects by different lengths of time. This may prevent too many signals from arriving at a receiving component at the same time and overwhelming the receiving component. Alternatively, the component may prevent the creation of signals.

The term "one-shot signal object," as used herein, may refer to a component that sends one signal. The one-shot signal object may be destroyed or deallocated after the transmission of a signal. An example of a one-shot signal object may include a one-shot timer, which may send one signal for indicating that a particular length of time has elapsed. Depending on context, the term "signal," as used herein, may refer to a software signal (e.g., a UNIX signal), an event (e.g., an occurrence of a change in state, as represented by an event object), or an occurrence of a callback.

The term "callback," as used herein, may refer to a function, a queue, or a subroutine whose address, location, or reference is passed from a caller function to a called function, through an argument list of the called function. In addition, the term "callback" may refer to a use or invocation of the callback.

The term "function," as used herein, may refer to a thread or portion of a thread (e.g., a subroutine, a method, etc.), which may be invoked via a name. As used herein, the term "argument list," may refer to a list of values that may be passed from a caller function to a called function. The term "invocation," as used herein, may refer to causing (e.g., calling) a piece of hardware or software to perform one or more actions. In addition, depending on context, the term may also refer to a function call, method call, and/or subroutine call.

Depending on context, as used herein, the term "thread" may be used interchangeably with the term "process" or "program." The terms "thread," process," or "program" and may refer to a sequence of instructions that may run independently of other threads, processes, and/or programs. In certain contexts, the term "thread" may also be interpreted to refer to an instance of a program or a thread instance.

Depending on context, "periodic," as used herein, may refer to "repetitive," "recurring," "iterative," etc. Periodic time interval may be regular or irregular.

In the following, a component may detect if signals are periodically sent from one-shot signal objects. By identifying the periodic invocations and associated latencies, various techniques that are often applied to multi-shot signal objects (e.g., signal objects that generate signals periodically after an invocation) to prevent system overloads may be applied to the signal-shot signal objects. For example, when one-shot signal objects are identified as being periodically invoked, the component may cause delays in transmissions of signals from the one-shot signal objects by different lengths of time. Alternatively, the component may prevent the creation of signals.

In determining whether the one-shot signal objects are periodic, the component may inspect a signal information object, which provides statistics of one-shot signal objects. Without the signal information object, obtaining the time statistics about the one-shot timer object may be difficult, because a one-shot signal object may be destroyed and become unavailable for inspection after transmitting a signal.

The signal information object may provide a context and parameters for taking corrective measures to prevent/alleviate system overloads. For example, assuming the periodic invocations of the one-shot signal objects are found to be associated with the processing latencies, the component may inject different delays in transmissions of signals at different one-shot signal objects based on information in the signal information object. This may prevent the signals from arriving at the receiving component at the same time, and therefore, may stop the one-shot signal objects from overburdening the receiving component. Alternatively, the component may prevent the transmissions of one-shot signals, and may send error messages to a thread that invoked the one-shot signal objects.

FIG. 1 is a diagram of an exemplary network 100 in which concepts described herein may be implemented. Network 100 may include the Internet, an ad hoc network, a local area network (LAN), a wide area network (WAN), a metropolitan area network (MAN), a cellular network, a public switched telephone network (PSTN), an intranet, or a combination of networks. While it is possible to implement the concepts without network 100, in a non-network device, network 100 may provide an environment or a context for the implementation and an application of the concepts.

As shown, network 100 may include N network devices 102-1 through 102-N (herein collectively referred to as network devices 102 and individually as network device 102-*x*). Each of network devices 102 may include a switch, a router, a server, and/or another type of device. While network devices 102 may be implemented as different types of devices, in the following paragraphs, network devices 102 will be described herein in terms of a router or a switch.

Figure 2:
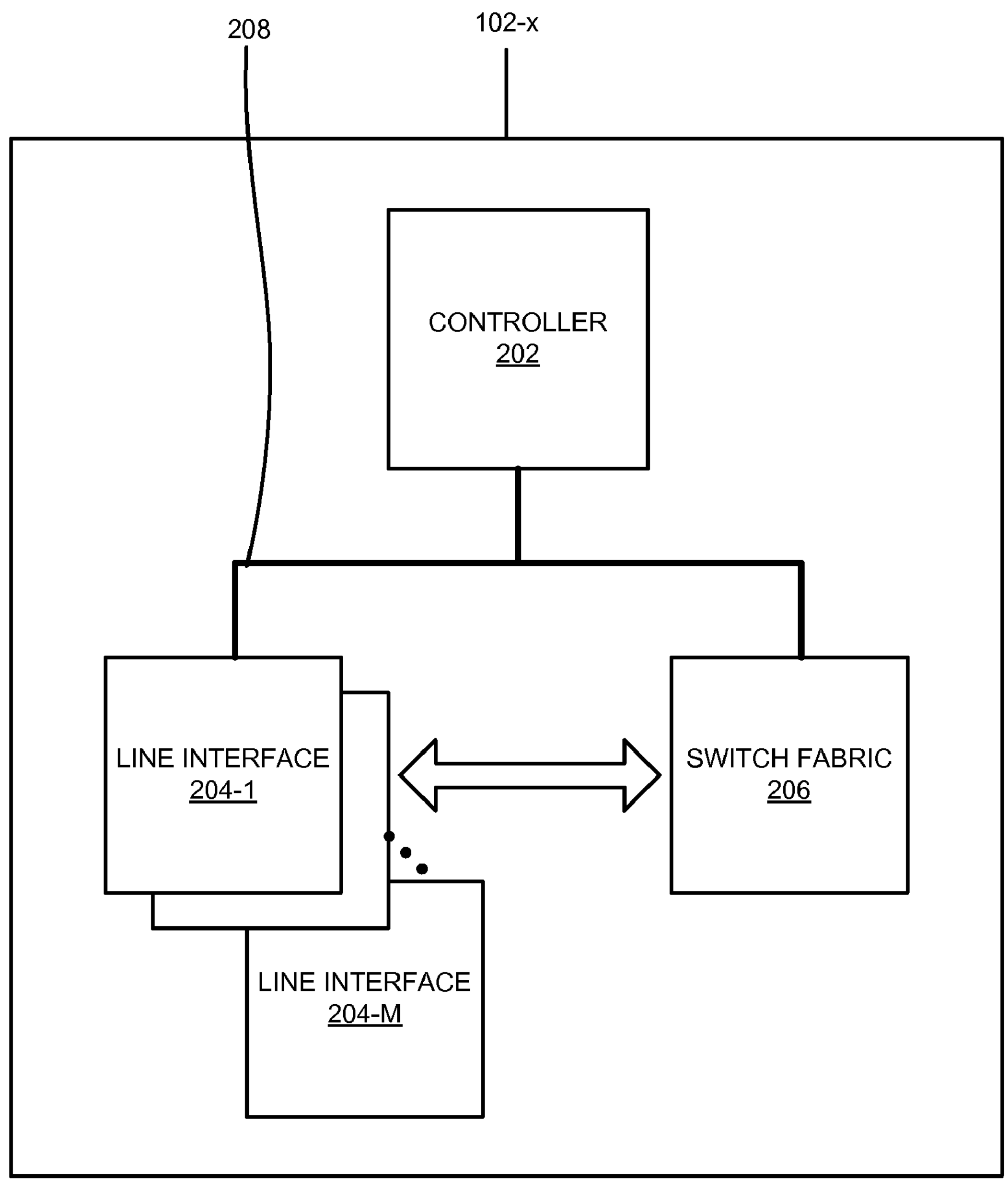
FIG. 2 is a block diagram of an exemplary network device of the exemplary network of FIG. 1.

FIG. 2 is a block diagram of exemplary network device 102-*x*. As shown, network device 102-*x* may include a controller 202, M line interfaces 204-1 through 204-M (herein collectively referred to as line interface 204 and individually as 204-*x*), a switch fabric 206, and a communication path(s) 208. Depending on implementation, network device 102-*x* may include additional, fewer, or different components than those illustrated in FIG. 2. For example, in one implementation, network device 102-*x* may include additional modules for rendering network services, such as a firewall service, a load balancing service, etc.

Controller 202 may include one or more devices for managing routes and/or performing services relating to centralized processing. Each of line interfaces 204 may include devices for receiving packets from network devices 102 in network 100 and for transmitting the packets to other network devices 102 in network 100. In addition, each of line interfaces 204 may perform packet forwarding, packet classification, and/or internal redirection of packets to other components in network device 102-*x* (e.g., other lines interfaces 204).

Switch fabric 206 may include switches for conveying packets to/from line interfaces 204 from/to others of line interfaces 204. Communication path(s) 208 may provide an interface through which components of network device 102-*x* can communicate with one another.

Figure 3:
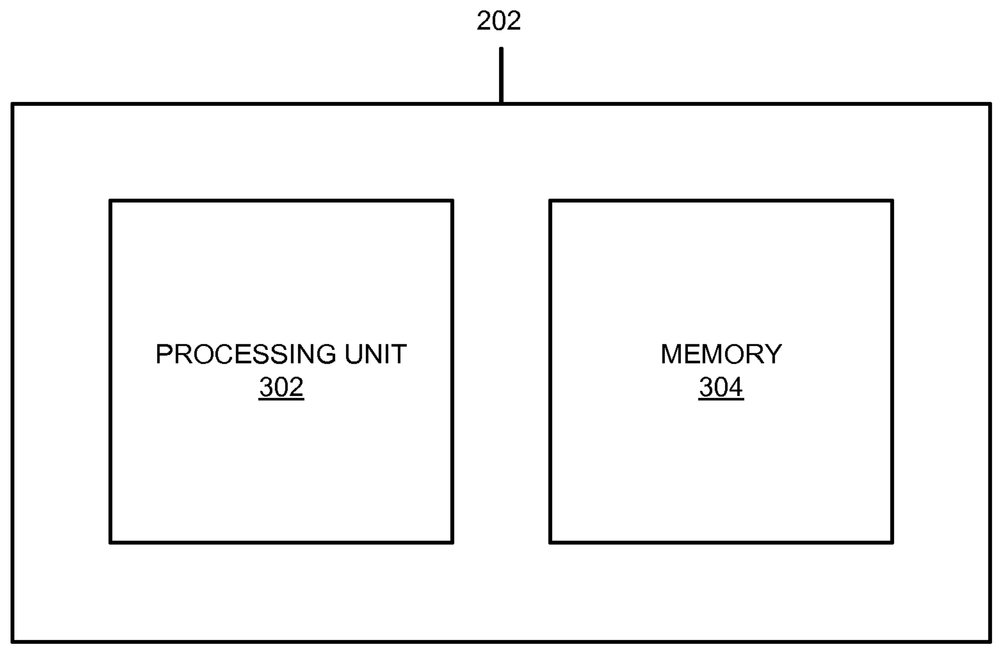
FIG. 3 is a block diagram of an exemplary controller of FIG. 2.

FIG. 3 is a block diagram of exemplary controller 202. As shown, controller 202 may include a processing unit 302 and a memory 304. Depending on implementation, controller 202 may include additional, fewer, and/or different components than those illustrated in FIG. 3.

Processing unit 302 may include one or more processors, microprocessors, Application Specific Integrated Circuits (ASICs), and/or Field Programmable Gate Arrays (FPGAs), and/or other processing logic. Memory 304 may include static memory, such as read only memory (ROM), and/or dynamic memory, such as random access memory (RAM), or onboard cache, for storing data and machine-readable instructions. Memory 304 may also include storage devices, such as a floppy disk, CD ROM, CD read/write (R/W) disc, and/or flash memory, as well as other types of storage devices.

Figure 4:
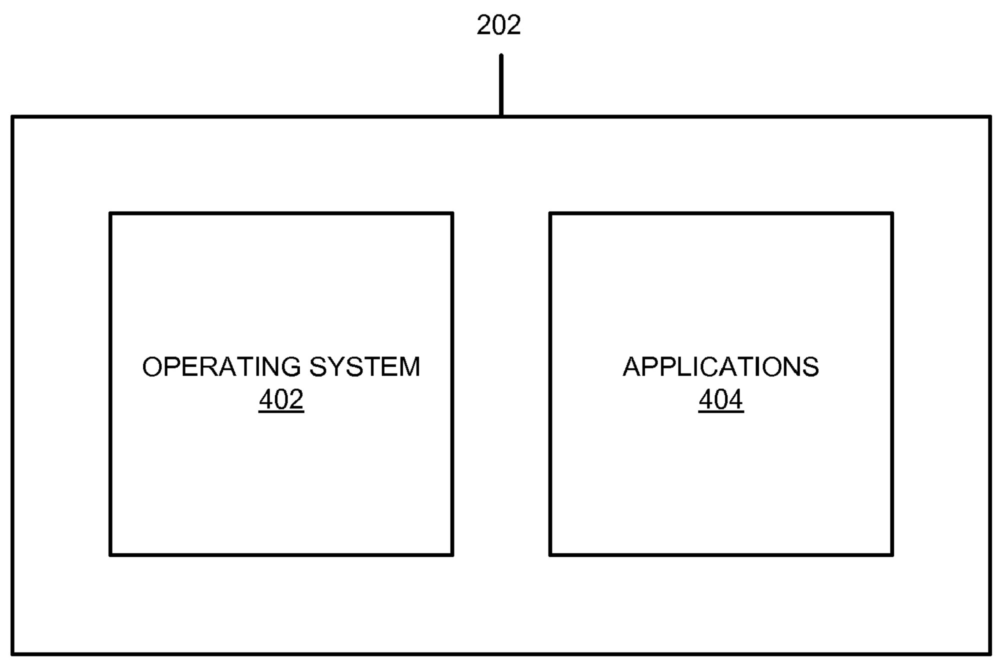
FIG. 4 is a functional block diagram of the exemplary controller of FIG. 2.

FIG. 4 is a functional block diagram of exemplary controller 202. As shown controller 202 may include an operating system 402 and applications 404 (e.g., client applications, server applications, etc.). Operating system 402 may include software for providing support for applications 404 and/or other types of programs (e.g., scripts) (not shown in FIG. 4). Applications 404 may include software for supporting various functionalities of network device 102-*x*, such as routing operations, database operations, etc.

Figure 5:
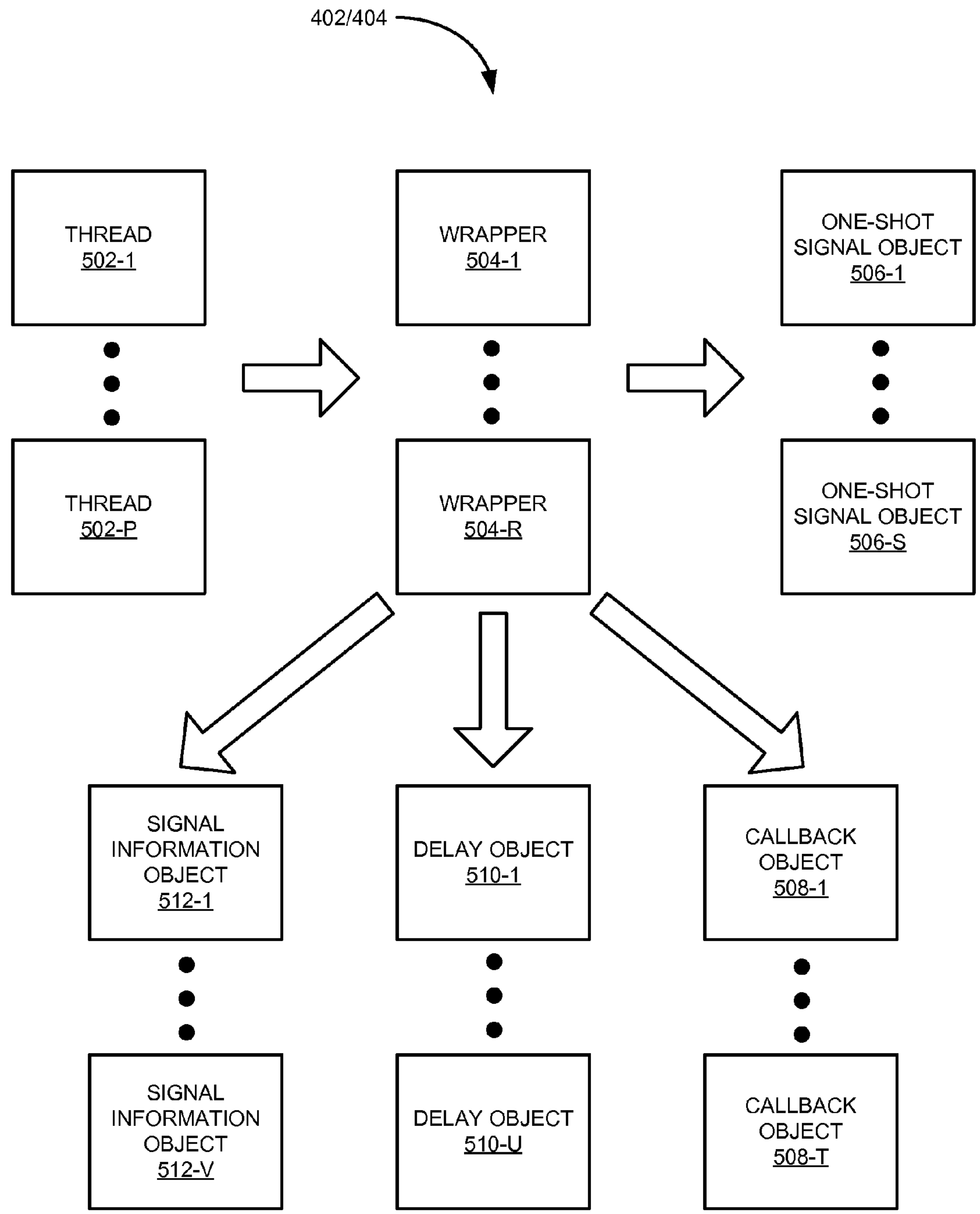
FIG. 5 is a functional block diagram of exemplary components in the operating system and/or the applications of FIG. 4.

FIG. 5 is a functional block diagram of exemplary components in operating system 402 and/or applications 404. As shown, operating system 402 and/or applications 404 may include threads 502-1 through 502-P (herein collectively referred to as threads 502 and individually referred to as a thread 502-*x*), wrappers 504-1 through 504-R (herein collectively referred to as wrappers 504 and individually referred to as a wrapper 504-*x*), one-shot signal object 506-1 through 506-S (herein collectively referred to as one-shot signal objects 506 and individually referred to as a one-shot signal object 506-*x*), callback objects 508-1 through 508-T (herein collectively referred to as callback objects 508 and individually referred to as a callback object 508-*x*), delay objects 510-1 through 510-U (herein collectively referred to as delay objects 510 and individually referred to as a delay object 510-*x*), and signal information objects 512-1 through 512-V (herein collectively referred to as signal information objects 512 and individually referred to as a signal information object 512-*x*). In different implementations, operating system 402 and/or applications 404 may include additional, fewer, or different components than those illustrated in FIG. 5.

Threads 502 may include instruction/object instances (e.g., a process stack, a thread stack, a Java object instance, etc.) for performing functions that are related to operating system 402 and/or applications 404. Each of threads 502 may or may not include different instructions and/or perform different functions (e.g., destroy sockets which are connected to client sockets that do not respond to keep-alive messages, perform a database lookup, etc.).

Wrapper 504-*x* may include an instruction/object instance for determining if a thread periodically invokes one-shot signal objects 506, for determining if there are processing latencies associated with one-shot signal objects 506, for passing a reference of callback object 508-*x* to one-shot signal object 506-*x* during an invocation of one-shot signal object 506-*x* and for injecting a delay into one-shot signal object 506-*x* Wrapper 504-*x* may perform these functions based on callback object 508-*x*, delay object 510-*x*, and/or signal information object 512-*x*. In addition, wrapper 504-*x* may create, update, and/or remove signal information object 512-*x*. Wrapper 504-*x* may invoke one-shot signal object 506-*x* no more than once. In certain situations, upon being invoked, wrapper 504-*x* may not call one-shot signal object. In such situations, wrapper 504-*x* may return an error message to its caller.

One-shot signal object 506-*x* may include an instruction/object instance for sending a signal. One-shot signal object 506-*x* may be removed or deleted from memory 304 after one-shot signal object 504-*x* sends the signal. An example of shot-shot signal object 506-*x* may include a one-shot timer object, for testing if a particular length of time has elapsed since its invocation and for sending a signal when the particular length of time has elapsed, or an event generator.

Callback object 508-*x* may include an instruction/object instance for handling a signal that is generated by one-shot signal object 506-*x*. Examples of callback object 508-*x* may include a function, a signal handler, a signal queue, an event queue, a subroutine, etc. In one implementation, a reference to callback object 508-*x* may be passed from wrapper 504-*x* to one-shot signal object 506-*x*, and the reference may be used by operating system 402 or one-shot signal object 506-*x* to invoke or use callback object 508-*x* when the signal is generated by one-shot signal object 506-*x*.

Delay objects 510 may include instruction/object instances of different types of delays. In one implementation, delay object 510-*x* may be implemented as a probability distribution function. The probability distribution function may approximate a probability density, such as a Gaussian probability density, a uniform probability density, a Dirac delta probability density, etc. For example, upon invocation, delay object 510-*x* may generate a delay value between 0 and Z (e.g., 30 seconds) based on a uniform probability density.

Signal information object 512-*x* may include one or more fields, records, and/or tables for maintaining information related to one-shot signal objects 506. The information may be used by wrapper 504-*x* to identify processing issues, periodic invocations of one-shot signal objects 506, etc.

FIG. 6 is a block diagram of exemplary signal information object 512-*x*. As shown, signal information object 512-*x* may include a thread identifier field 602, a signal counter field 604, an effective instruction pointer (EIP) register field 606, and epoch fields 608-616. Depending on implementation, signal information object 512-*x* may include fewer, additional, or different fields than those illustrated in FIG. 6. For example, for each signal, signal information object 512-*x* may include fields for recording amounts of time that one-shot signal objects 506 may wait until the signal is generated. Examples of other fields may include a field for an identifier of a thread in which a shot-shot signal object generates one of the delay signals, a field for an identifier of a thread that includes a callback object 508-*x*, a field for a state context, etc.

Thread identifier field 602 may contain information that identifies thread 502-*x* in which wrapper 504-*x* is called. In one implementation, thread identifier field 602 may be used by wrapper 504-*x* in locating signal information object 512-*x* that pertains to thread 502-*x*. Signal counter field 604 may indicate the number of times one-shot signal objects 506 have been called from within thread 502-*x*. EIP register field 606 may store a value of an EIP register (e.g., a register that identifies a next instruction for execution in a called function), and may serve a similar role as thread identifier field 602.

Each of epoch fields 608-616 may indicate the number of times one-shot signal objects 506 have been called within different epochs. In one implementation, an epoch field 608 may be initialized to zero when wrapper 504-*x* is invoked from within thread 502-*x*. At each subsequent invocation of wrapper 504-*x*, epoch field 608 may be used to count the invocations. The counting may continue until an allotted time span for the epoch field elapses. After that point, a next epoch field (e.g., epoch field 610) may be used to count invocations for another epoch. In some implementations, the start time and the end time may be written into an epoch field at the start and at the end of each epoch.

In another implementation, signal information object 512-*x* may dynamically grow in size as additional epoch fields are added to signal information object 512-*x*.

EXEMPLARY PROCESS FOR DELAYING ONE-SHOT SIGNAL OBJECTS

Figure 7:
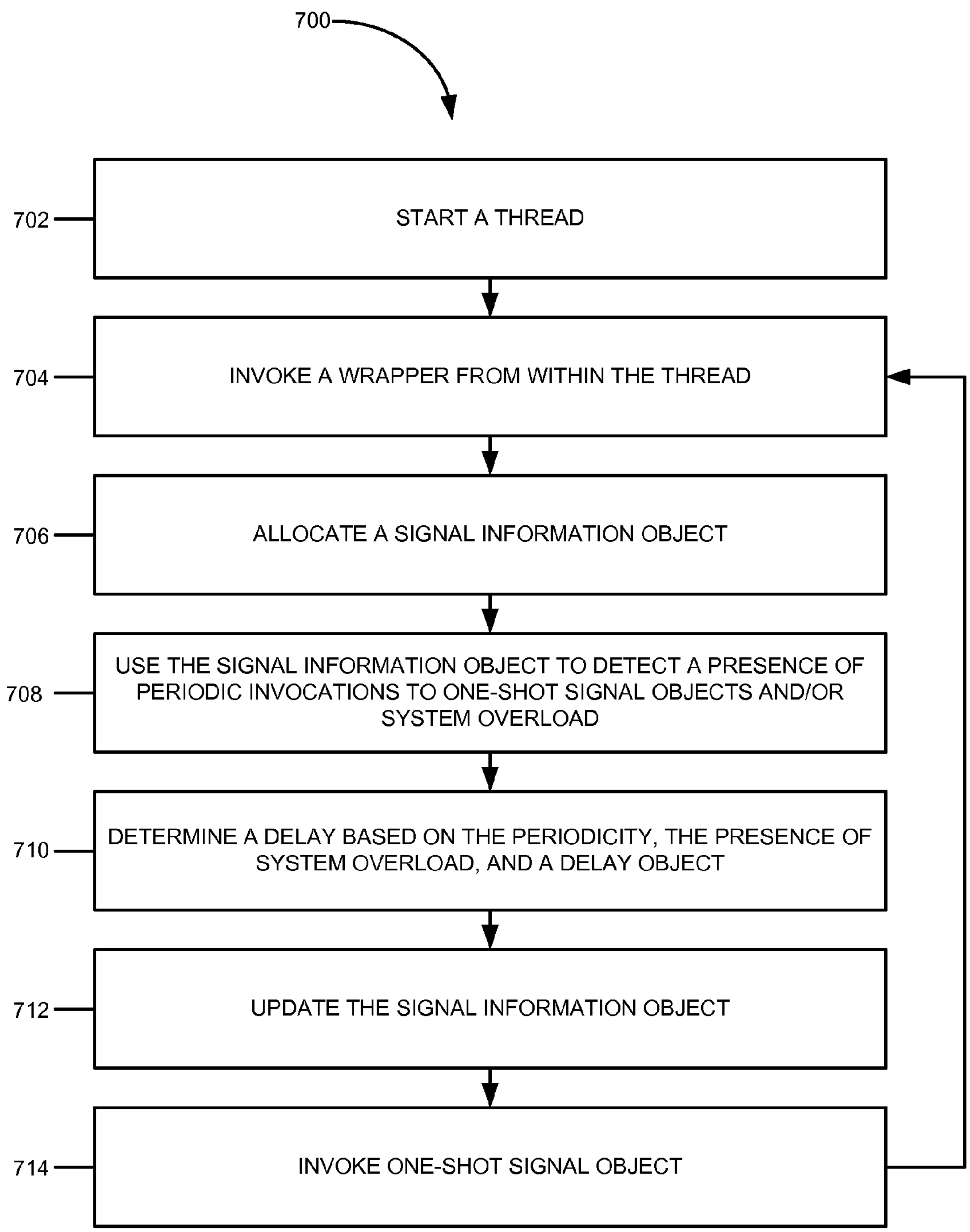
FIG. 7 is a flow diagram of an exemplary process for delaying one-shot signal objects.

The above paragraphs describe system elements that are related to devices and/or components for delaying transmissions of signals from different one-shot signal objects 506. FIG. 7 is a flow diagram of an exemplary process 700 that is capable of being performed by one or more of these devices and/or components.

Process 700 may begin with the starting of thread 502-*x* (block 702). Depending on circumstances, thread 502-*x* may be started by operating system 402, from within applications 404, or another thread (e.g., fork, exec, etc.).

Wrapper 504-*x* may be invoked from within thread 502-*x* (block 704). In some implementations, wrapper 504-*x* may be a function, a subroutine, and/or a method of a class object. In another implementation, wrapper 504-*x* may be a thread separate from thread 502-*x*. In this case, invocation of wrapper 504-*x* may involve placing a message that requests a signal in an input queue for wrapper 504-*x*. In the following discussions, for the sake of simplicity, it is assumed that wrapper 504-*x* is a method, a function or a subroutine rather than a thread separate from thread 502-*x*.

Signal information object 512-*x* may be allocated (block 706). Because signal information object 512-*x* is used to collect statistics of one-shot signal objects 506 that are invoked from within wrappers 504 in a single thread, signal information object 512-*x* may need to exist after a single call to wrapper 504-*x*. As such, signal information object 512-*x* may be allocated in a local heap that is owned by thread 502-*x*, on a stack that is local to thread 502-*x*, on a stack that is local to a process that owns thread 502-*x*, in a global heap, or in shared memory (e.g., memory that is shared between different processes). In all of the preceding cases, signal information object 512-*x* may exist after a single execution of wrapper 504-*x*. If another call is made to wrapper 504-*x* from within the same thread, the same signal information object 512-*x* may be accessed. In a different implementation, a pre-allocated signal information object 512-*x* may be assigned to thread 502-*x* when thread 502-*x* is created, begins to execute, or when wrapper 504-*x* is invoked for the first time.

Once signal information object 512-*x* is created, a memory location that is local to thread 502-*x*, or a global memory location, may be used to store a reference to signal information object 512-*x*. The memory location may be accessed from within different instances of wrapper 504-*x*.

In a different implementation, the memory location, which may be denoted by a global variable, may hold a value that can be used to obtain various offsets for locating one or more signal information objects 512. For example, a global variable may hold the address of a hash table that contains addresses of signal information objects 512. In such a case, the address of each signal information object 512-*x* may be placed in a specific bucket of the hash table based on thread identifier 602.

Signal information object 512-*x* may be used to detect a presence of periodic invocations to one-shot signal objects 506 and/or system overload (block 708). In one implementation, if a memory location (e.g., a global variable, a hash table, etc.) contains a reference to signal information object 512-*x*, the reference may be used to locate signal information object 512-*x*. Subsequently, signal information object 512-*x* may be inspected to detect if one-shot signal objects 506 are periodically being invoked and/or a system overload is present.

Figure 8A:
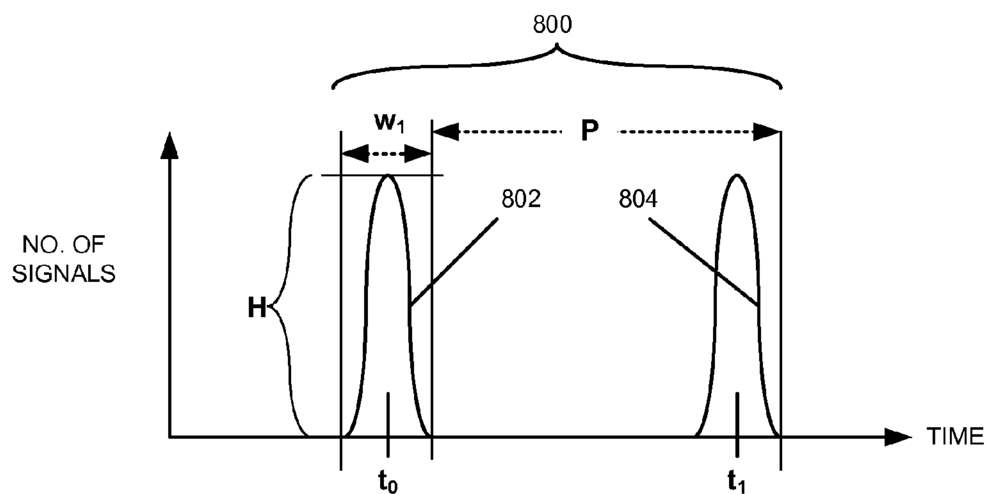
FIG. 8A is an exemplary graph of number of signals as a function of time prior to applying delays to one-shot signal objects of FIG. 5.

FIG. 8A is an exemplary graph 800 of the number of signals as a function of time. Graph 800 may be obtained by plotting a number of signals in each of epoch fields 608-616. As shown, graph 800 may include lobes 802 and 804 around time $t_0$ and $t_1$. Based on values in epoch fields 608-616, width $w_1$, height H, and period P may be measured. If there are more than two lobes, P may vary, depending on lobes that are used to determine P. In addition, depending on implementation, parameters (e.g., $w_1$, height H, and period P) may be stored in signal information object 512-*x*, so that it may be unnecessary to compute or measure them each time wrapper 504-*x* is invoked.

In addition to detecting if one-shot signal objects 506 are repeatedly invoked, the presence of system overload may be detected. Depending on the implementation, the system overload may be detected in various ways. For example, if a ratio $H/w_1$ exceeds a particular threshold, it may be determined that too many signals are being generated per unit time, and that the signals may cause a temporary overload of network device 102-*x*.

In another example, the system overload may be detected by monitoring average amount of signal delays. To illustrate, assume that each of one-shot signal objects are set to trigger 30 seconds (e.g., +/−delay interval of 30 seconds) after its invocation, with an additional delay of Z seconds added by wrapper 504-*x*. If the one-shot signal objects are triggered late by a particular amount (e.g., 6 seconds), the system overload may be detected. In such implementations, signal information object 512-*x* may be used to store/track the average delay or the delay of each one-shot signal object.

Figure 8B:
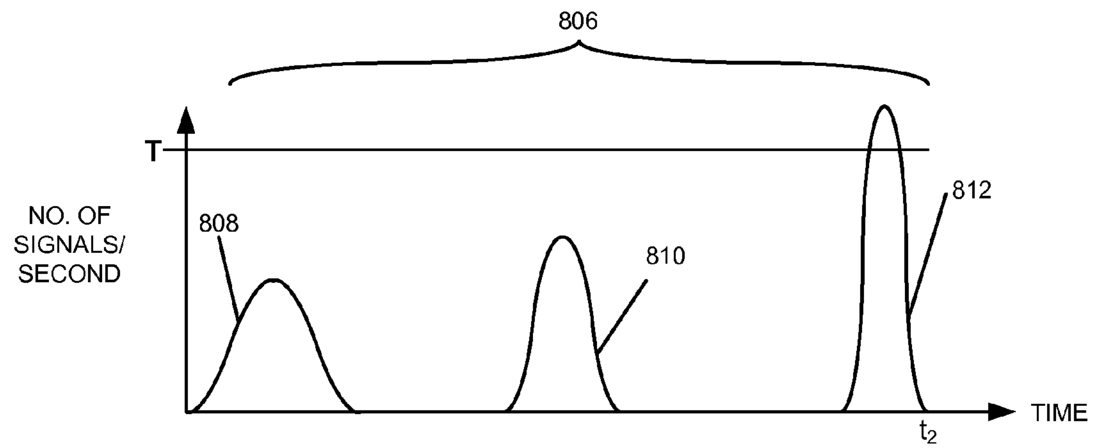
FIG. 8B is an exemplary graph of a rate of generating or receiving signals in network devices that have processing problems.

FIG. 8B is an exemplary graph 806 of a rate of signals that are being generated in network device 102-*x*. Graph 806 may be obtained by plotting a number of signals in epoch fields 608-616 per unit time. As shown, graph 806 may include lobes 808, 810, and 812. In FIG. 8B, lobes 808, 810, and 812 illustrate a "catch-up" behavior, in which a temporary system overload causes bunching of signals that are being generated from one-shot signal objects 506. Narrowing of the lobes may indicate an increasing system load in a network device that generates the signals.

A delay may be determined based on the periodicity, the presence of system overload, and delay object 510-*x* (block 710). To determine the delay, the presence of system overload and the periodicity may be used in conjunction with delay object 510-*x*. Delay object 510-*x* itself may have been selected or identified based on user input or default system settings.

More specifically, if there is a system overload, delay object 510-*x* may be used to produce a specific value of delay. As explained above in connection with delay objects 510, the value may depend on a specific probably distribution that delay object 510-*x* implements. For example, if wrapper 504-*x* calls delay object 510-*x* that implements a uniform probability distribution over period P, delay object 510-*x* may generate a random number that is between 0 and P as the specific value of delay.

If there is no system overload, depending on implementation, delay object 510-*x* may or may not be used to produce the specific value.

Signal information object 512-*x* may be updated (block 712). In one implementation, a network device or an application that receives a signal may update signal information object 512-*x*. In a different implementation, signal information object 512-*x* may be updated by wrapper 504-*x*. In such a case, to properly modify epoch fields, wrapper 504-*x* may examine values that are passed to wrapper 504-*x*.

Figure 9:
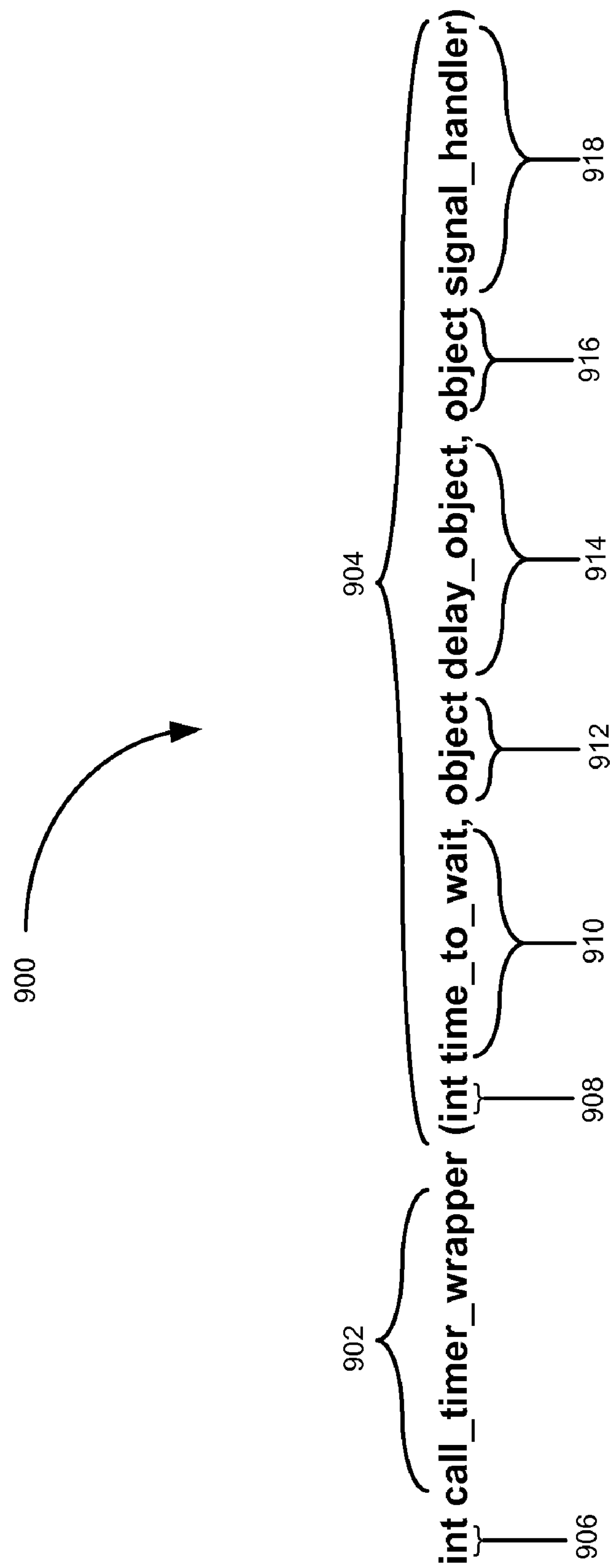
FIG. 9 shows an exemplary application programming interface of a wrapper of FIG. 5.

To illustrate, assume wrapper 504-*x* is a function that can be characterized by an application programming interface (API). FIG. 9 shows an exemplary API 900 for wrapper 504-*x*. As shown, API 900 may include a function name 902 (e.g., call_timer_wrapper), an argument list 904 (e.g., (int time_to_wait, object delay_object, object signal_handler)), and a return value type 906 (e.g., int). Function name 902 may include a symbolic name by which a function may be invoked. Argument list 904 may include a list of values that may be passed into wrapper 504-*x* called call_timer_wrapper 902. Return value type 906 may indicate the data type that may be returned to a caller function when wrapper 504-*x* terminates.

As further shown in FIG. 9, argument list 904 may include an argument type 908 (e.g., int), an argument name 910 (e.g., time_to_wait), an argument type 912 (e.g., object), an argument name 914 (e.g., delay_object), an argument type 916 (e.g., object), and an argument name 918 (e.g., signal_handler). Argument types 908, 912, and 916 may identify the data type of each argument, and argument names 910, 914, and 918 may identify the arguments that are passed to wrapper 504-*x*. In a body of wrapper 504-*x* code, the argument names may be used to reference each argument. In different implementations, argument list 904 may include additional, fewer, or different argument types (e.g., float) or argument names than those illustrated in FIG. 9.

Time_to_wait argument 910 may indicate the amount of time a one-shot signal object 506-*x* may wait until one-shot signal object 506-*x* generates a signal. Wrapper 504-*x* may adjust time_to_wait argument 910 by the specific delay value and pass adjusted time_to_wait argument 910 to one-shot signal object 506-*x*. Delay_object argument 914 may designate a specific delay object 510-*x* that is to be used for determining a length of delay that one-shot signal object 506-*x* may wait before generating a signal. For example, delay_object argument 914 may designate a uniform probability distribution function. Signal_handler argument 918 may designate a function that may be triggered when a signal is produced by one-shot signal object 506-*x*.

Returning to FIG. 7, to modify an epoch field, wrapper 504-*x* may use delay_object 914 (e.g., invoke) to calculate or determine a value of delay. Once the delay is determined, wrapper 504-*x* may modify time_to_wait argument 910, by either subtracting or adding the delay to time_to_wait argument 910.

Time_to_wait plus/minus delay may then be used to select the epoch field that may be modified. For example, if time_to_wait+/−delay is 30 seconds, an epoch field which represents the time interval that begins after 30 seconds may be selected and incremented.

One-shot signal object 506-*x* may be invoked (block 714). In one implementation, one-shot signal object may be invoked from within wrapper 504-*x*, via a call interface that is similar to API 900 for wrapper 504-*x*. Furthermore, via the call interface, time_to_wait+/−delay may be passed to the one-shot signal object 506-*x*. Once invoked, one-shot signal object 506-*x* may wait for time_to_wait+/−delay to elapse, before generating a signal. In some implementations, where signals cause "catch-up" behavior as in FIG. 8B, wrapper 504-*x* may withhold invoking one-shot signal objects 506 to provide a temporary relief to system overload.

If threads 502-*x* calls many wrappers 504, wrappers 504 may invoke many one-shot signal objects 506, each with a different delay. Consequently, signals from one-shot signal objects 506 may arrive at a receiving component or a device over period P.

Figure 10:
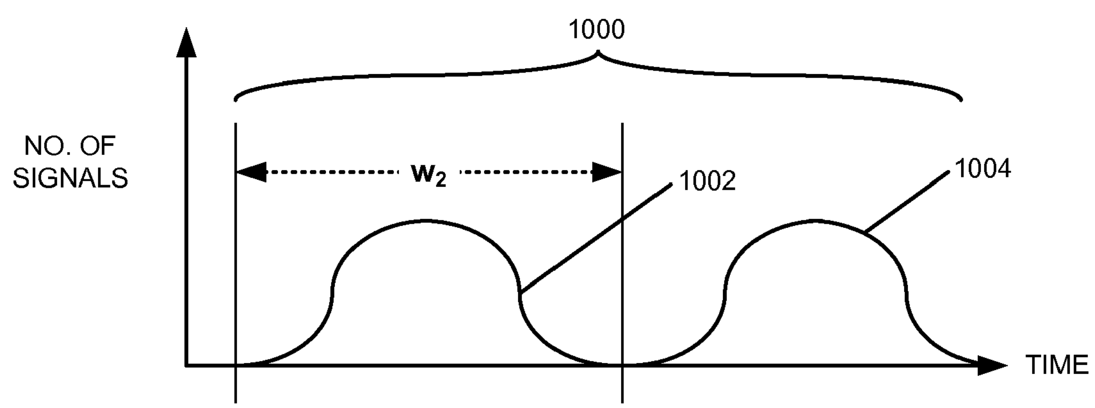
FIG. 10 is an exemplary graph of the number of signals as a function of time after different delays are applied to one-shot signal objects of FIG. 5.

FIG. 10 is an exemplary graph 1000 of the number of signals as a function of time after different delays are applied to one-shot signal objects 506. As shown, graph 1000 may include lobes 1002 and 1004, which have width $w_2$. If lobes 802 and 804 in FIG. 8A represent the number of signals from one-shot signal objects 506 as a function of time before delays are applied, lobes 1002 and 1004 illustrate how applying the delays may increase the width of the lobes from $w_1$ of lobe 802 in FIG. 8A to $w_2$ in lobe 1002 in FIG. 10.

Returning to FIG. 7, at block 714, process 700 may return to block 704 to continue to invoke one-shot signal objects. In some implementation, wrapper 504-*x* may not call one-shot signal object when wrapper 504-*x* detects the presence of system overload. In such implementations, wrapper 504-*x* may generate an error message for the thread that invoked wrapper 504-*x*.

In the above, wrapper 504 may detect if signals are periodically sent from one-shot signal objects. By identifying the periodic invocations and associated latencies, various techniques that are often applied to multi-shot signal objects (e.g., signal objects that generate signals periodically after an invocation) to prevent system overloads may be applied to the one-shot signal objects 506. For example, when one-shot signal objects 506 are identified as being periodically invoked, wrapper 504 may cause delays in transmissions of signals from the one-shot signal objects by different lengths of time. Alternatively, wrapper 504 may prevent the creation of signals.

In determining whether one-shot signal objects 506 are periodically invoked, wrapper 504-*x* may inspect a signal information object 512-*x*, which provides statistics of one-shot signal objects 506. Without signal information object 512-*x*, obtaining the time statistics about one-shot timer objects 506 may be difficult, because a one-shot signal object 506-*x* may be destroyed and become unavailable for inspection after transmitting a signal.

The signal information object may provide a context and parameters for taking corrective measures to prevent/alleviate system overloads. For example, assuming the periodic invocations of one-shot signal objects 506 are found to be associated with the processing latencies, the component may inject different delays in transmissions of signals at different one-shot signal objects 506 based on information in signal information object 512-*x*. This may prevent the signals from arriving at the receiving component at the same time, and therefore, may stop one-shot signal objects 506 from overburdening components that receive the one-shot signals. Alternatively, wrapper 504-*x* may prevent the transmissions of one-shot signals, and may send error messages to a thread that invoked the one-shot signal objects.

EXAMPLE

Figure 11:
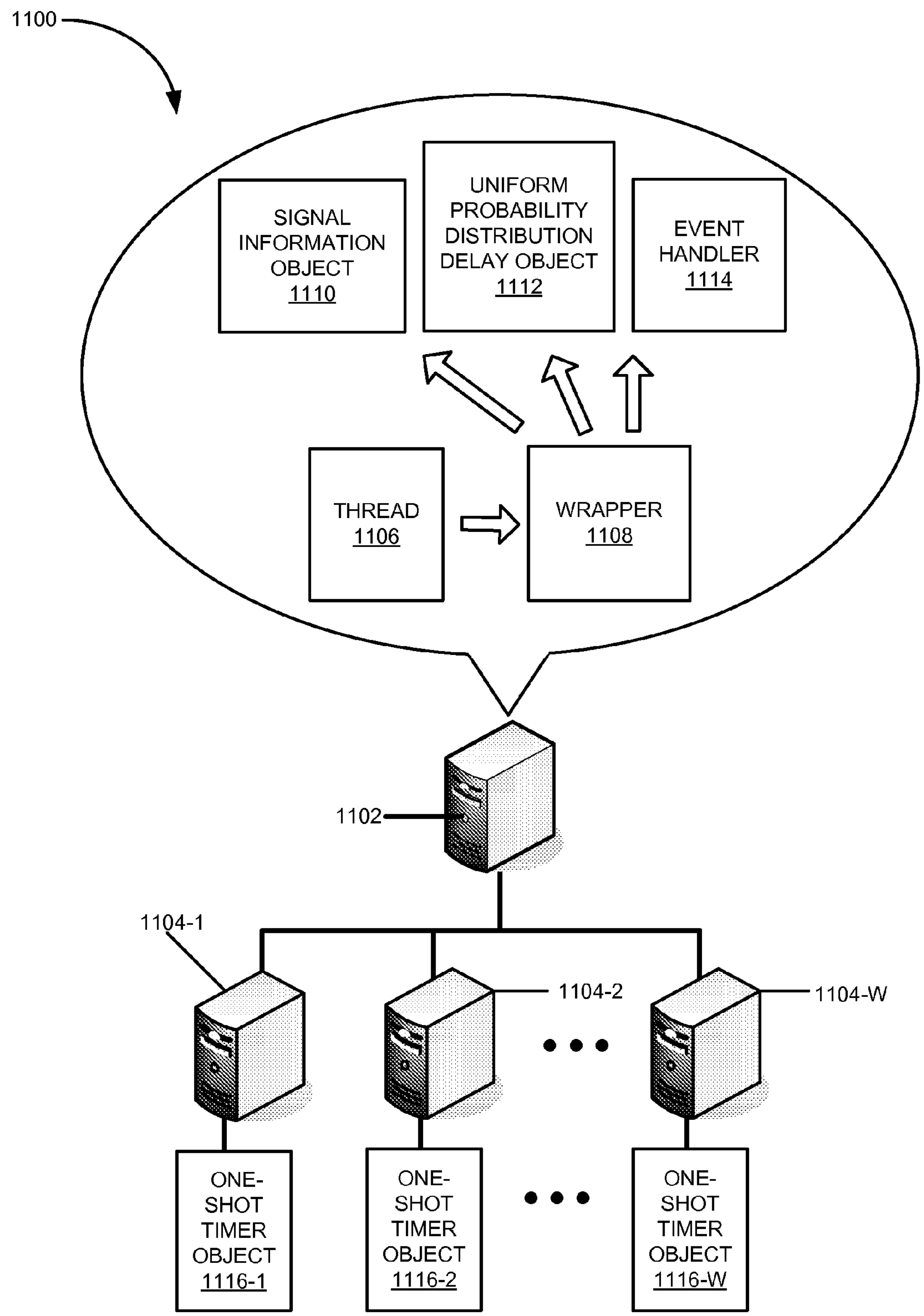
FIG. 11 illustrates an exemplary system that delays one-shot signals in accordance with the process of FIG. 7.

The following example, together with reference to FIG. 11, illustrates an exemplary system that delays one-shot signals. The example is consistent with exemplary process 700 described above with reference to FIG. 7.

For the example, as shown in FIG. 11, assume that a system 1100 includes a server device 1102 and client devices 1104-1 through 1104-W (herein collectively referred to as client devices 1104 and individually as client device 1104-*x*). Server device 1102 includes thread 1106, wrapper 1108, signal information object 1110, a uniform probability distribution delay object 1112, and an event handler 1114 (an example of callback object 508-*x*). Client devices 1104 include one-shot timer objects 1116 (an example of one-shot signal objects 506).

In the example, thread 1106 manages and recycles server device 1102's system resources (e.g., memory) that are used for communication between server device 1102 and client devices 1104. More specifically, thread 1106 may identify system resources that are no longer needed for the communication and recycle the system resources, when client device 1104-*x* fails to respond to keep-alive messages that are periodically sent to client device 1104-*x*.

When thread 1106 sends a keep-alive message to client device 1104-*x*, thread 1106 invokes wrapper 1108. In turn, wrapper 1108 determines the periodicity of calls to one-shot timer objects 1116, uses uniform probability distribution delay object 1112 to compute a delay based on the periodicity, and calls one-shot timer object 1116-*x* based on the delay. In response, one-shot timer object 1116-*x* sleeps for a particular amount of wait time, and generates a keep-alive response when the wait time expires. The keep-alive response is received by event-handler 1114, which allows thread 1106 to retain the system resources that are allocated for communicating with client device 1104-*x*.

Each of one-shot timer objects 1116 is called by thread 1106 with a time delay in a manner similar to that described above for one-shot timer object 1104-*x*. Consequently, the keep-alive messages are prevented from arriving at server device 1102 at the same time and overwhelming server device 1102.

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while a series of blocks has been described with regard to exemplary process 700 illustrated in FIG. 7, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:

determining, by a server device, whether a plurality of one-shot signal objects are periodically invoked;

determining, by the server device, a delay for the plurality of one-shot signal objects when the plurality of one-shot signal objects are periodically invoked;

invoking, by the server device, one of the plurality of one-shot signal objects based on the delay; and removing, by the server device, the one of the plurality of one-shot signal objects from a memory of the server device after invoking the one of the plurality of one-shot signal objects.

2. The method of claim 1, where determining the delay comprises:

selecting a delay object based on at least one of a user input or a default setting; and determining the delay based on the delay object.

3. The method of claim 2, where the delay is based on a probability distribution implemented by the delay object.

4. The method of claim 1, further comprising:

allocating a signal information object to collect statistics of the plurality of one-shot signal objects, where determining whether the plurality of one-shot signal objects are periodically invoked includes inspecting the signal information object; and updating an argument of the signal information object based on the delay.

5. The method of claim 1, further comprising:

detecting whether a system overload is present; and using a delay object to determine the delay for the plurality of one-shot signal objects when the system overload is present.

6. The method of claim 1, where the one of the plurality of one-shot signal objects comprises:

a one-shot timer, or an event generator.

7. A non-transitory computer-readable medium storing instructions, the instructions comprising:

one or more instructions which, when executed by one or more processors of a device, cause the one or more processors to detect whether a first one-shot signal object and a second one-shot signal object generate signals at periodic intervals;

one or more instructions which, when executed by the one or more processors, cause the one or more processors to determine a delay time when the first one-shot signal object and the second one-shot signal object generate signals at periodic intervals;

one or more instructions which, when executed by the one or more processors, cause the one or more processors to invoke the first one-shot signal object based on the delay time; and one or more instructions which, when executed by the one or more processors, cause the one or more processors to delete the first one-shot signal object from a memory of the device after invoking the first one-shot signal object.

8. The non-transitory computer-readable medium of claim 7, where the one or more instructions to invoke the first one-shot signal object comprises at least one of:

one or more instructions to invoke the first one-shot signal object to generate a delayed signal based on the delay time; or one or more instructions to invoke the first one-shot signal object to send the delayed signal.

9. The non-transitory computer-readable medium of claim 7, where the one or more instructions to determine the delay time comprises:

one or more instructions to detect whether a system overload exists; and one or more instructions to determine the delay time by using a delay object when the system overload exists.

10. The non-transitory computer-readable medium of claim 9, where one or more instructions to determine the delay time using the delay object comprises:

one or more instructions to use a probability distribution implemented by the delay object.

11. A device comprising:

a memory to store instructions;

a processor to execute the instructions in the memory to:

detect whether a particular condition is met, the particular condition being met when a plurality of one-shot signal objects are periodically invoked or signals are overloading the device, determine a delay associated with the particular condition when the particular condition is met, invoke one of the plurality of one-shot signal objects based on the delay, and generate an error message when the signals are overloading the device.

12. The device of claim 11, where, when invoking the one of the plurality of one-shot signal objects, the processor is further to:

inject the delay into the one of the plurality of one-shot signal objects, and call the one of the plurality of one-shot signal objects.

13. The device of claim 11, where the processor is further to:

create a signal information object, and update the signal information object based on the delay.

14. A method comprising:

allocating, by a server device, a signal information object to collect statistics of a plurality of one-shot signal objects;

determining, by the server device, whether a plurality of one-shot signal objects are periodically invoked, determining whether the plurality of one-shot signal objects are periodically invoked including:

inspecting the signal information object for the statistics of the plurality of one-shot signal objects collected by the signal information object;

determining, by the server device, a delay for the plurality of one-shot signal objects when the plurality of one-shot signal objects are periodically invoked; and invoking, by the server device, one of the plurality of one-shot signal objects based on the delay.

15. The method of claim 14, further comprising:

injecting the delay into the one of the plurality of one-shot signal objects; and invoking the one of the plurality of one-shot signal objects after injecting the delay.

16. A device comprising:

a memory to store instructions;

a processor to execute the instructions in the memory to:

detect whether a particular condition is met, the particular condition being met when a plurality of one-shot signal objects are periodically invoked, when detecting whether the particular condition is met, the processor is further to:

determine whether the plurality of one-shot signal objects are periodically invoked based on statistics provided by a signal information object, determine a delay associated with the particular condition when the particular condition is met, when determining the delay, the processor is further to:

receive parameters, for taking corrective measures, from the signal information object, and determine the delay based on the parameters, and invoke one of the plurality of one-shot signal objects based on the delay.

17. The device of claim 16, where the processor is further to:

create the signal information object to collect the statistics prior to detecting whether the particular condition is met, where the statistics relate to the plurality of one-shot signal objects.

18. A non-transitory computer-readable medium storing instructions, the instructions comprising:

one or more instructions which, when executed by one or more processors of a device, cause the one or more processors to detect whether a particular condition is met, the particular condition being met when a plurality of one-shot signal objects are periodically invoked;

one or more instructions which, when executed by the one or more processors, cause the one or more processors to determine a delay associated with the particular condition when the particular condition is met;

one or more instructions which, when executed by the one or more processors, cause the one or more processors to invoke one of the plurality of one-shot signal objects based on the delay;

one or more instructions which, when executed by the one or more processors, cause the one or more processors to receive a delayed signal from the one of the plurality of one-shot signal objects; and one or more instructions which, when executed by the one or more processors, cause the one or more processors to invoke a callback object to handle the delayed signal.

19. A non-transitory computer-readable medium storing instructions, the instructions comprising:

one or more instructions which, when executed by one or more processors of a device, cause the one or more processors to detect whether a first one-shot signal object and a second one-shot signal object generate signals at periodic intervals;

one or more instructions which, when executed by the one or more processors, cause the one or more processors to determine a delay time when the first one-shot signal object and the second one-shot signal object generate signals at periodic intervals; and one or more instructions which, when executed by the one or more processors, cause the one or more processors to invoke the first one-shot signal object based on the delay time, the first one-shot signal object comprising:

a one-shot timer, or an event generator.

20. The non-transitory computer-readable medium of claim 19, where the one-shot timer tests whether a particular length of time has elapsed after invoking the first one-shot signal object.

* * * * *